United States Patent Office 3,188,369
Patented June 8, 1965

3,188,369
REINFORCED PLASTIC
Roger T. Guthrie, Enka, N.C., assignor to American Enka Corporation, Enka, N.C., a corporation of Delaware
No Drawing. Filed Feb. 9, 1962, Ser. No. 172,090
2 Claims. (Cl. 264—128)

This application is a continuation-in-part of application Serial No. 834,631, filed August 19, 1959, and now abandoned. The present invention relates to fiber reinforced articles and more particularly to a synthetic resin, laminated article having fiber reinforcement.

Synthetic resin, laminated articles reinforced with glass fibers are well known and have found extensive use in electronic equipment. Such may be in sheet, rod, or other desirable shapes. One particular glass reinforced synthetic resin has been found to be particularly useful in radio frequency and microwave electronic equipment. This is the styrene-divinylbenzene copolymer.

Such materials have not been completely satisfactory at high radio frequencies because of their tendency to heat. The styrene-divinylbenzene copolymer reinforced with glass fibers has proved to be the most satisfactory. However, even this copolymer suffers from a very low impact strength and a dielectric constant that is barely within acceptable limits for some high frequency uses. In addition, this copolymer when reinforced with glass fabrics has a marked tendency to delaminate when subjected to slight strains and the hydrophilic nature of glass results in undesirably high sorption of moisture. It has been suggested that an improved dielectric constant may be obtained if the glass reinforcement is not used, but such is at a sacrifice of impact strength imparted by the reinforcement.

Therefore, it is a primary object of this invention to provide a reinforced synthetic resinous article that does not have the disadvantages of the prior art.

It is a further object of this invention to provide a reinforced synthetic resinous article of improved impact strength and dielectric constant.

It is another object of this invention to provide a polystyrene reinforced article of improved properties.

It is still a further object of this invention to provide a styrene-divinylbenzene copolymer reinforced with fibers.

Another object of this invention is to provide a synthetic resinous article of low dielectric constant and high impact strength.

Still a further object of this invention is to obtain a synthetic resinous article which is less affected by humidity than those of the prior art.

An additional object is to obtain a reinforced product with a lower specific gravity than the glass reinforced product heretofore used or even lower than the pure copolymer.

Other objects of this invention will be apparent from the following detailed description.

In general, the objects of this invention may be obtained by reinforcing a synthetic resinous article with polypropylene fibers. The polypropylene fibers may be in any one of several forms. Thus, they may be in skein form, staple fiber, woven into a fabric or mat, or used in a non-woven form.

The synthetic resinous articles consist normally of a uniform, homogeneous resin having embedded therein webs, mats, or other forms of polypropylene reinforcing material. The reinforcing material occupies a fraction of the total thickness of the resin, which fraction normally ranges from 6 to 67% by weight of the total weight of the finished article.

It is important that these articles be fashioned in such a way that there is intimate contact between the resin and substantially the entire surface of the reinforcing fibrous article. In addition, it is also important that entrapment of gases in the article be prevented. It is believed that desirable electrical properties are obtained by such contact and that the possibility of delamination and strength loss can be reduced somewhat by insuring proper contact and prevention of entrapped gases. It has been found that polypropylene affords excellent contact with the resin and thus makes a further contribution to the prevention of delamination.

These articles are formed by positioning the polypropylene fiber, fabric, etc., between casting surfaces, then introducing between the surfaces a low viscosity liquid polymerizable into a resin and polymerizing the liquid. The liquid should preferably be polymerizable predominately by the addition mechanism in order to prevent the formation of entrapped non-resinous by-products. The resins which may be used must satisfy the foregoing requirements. Examples of these include styrene, vinyl chloride, vinyl acetate, methyl acrylate, methyl methacrylate, epoxy compounds, allyl diglycol carbonates, and low molecular weight polyesters. The polymerization may be accelerated by 0.005–0.5% by weight of a free radical catalyst such as benzoyl peroxide, isopropyl percarbonate, and t-butyl perbenzoate.

These resins may be either linear or cross-linked, as by copolymerization of one of the above with a cross-linking compound such as divinylbenzene or tung oil when used with styrene in amounts of 0.1–25%. Such cross-linked resins are the preferred compounds because they are infusible and therefore can be used at elevated temperatures.

The liquid resin-forming material should be of sufficiently low viscosity that it will penetrate the polypropylene material. It should also wet or adhere to the material to insure intimate contact.

To further illustrate this invention, several sheets of synthetic resinous material were prepared, some of which contained various types of polypropylene, others contained glass fibers, and still others were not reinforced. For the sake of comparison, all of the samples were prepared in the same manner and are illustrated in the following table, in which the reinforcing material and test results are shown.

Each of these samples was subjected to the notched Charpy Impact Test described in ASTM Designation D 256–47T. In addition, the dielectric constant for each was determined by placing the samples between metallic electrodes and measuring the capacitance and dissipation factor of the resulting capacitor, which method is described in ASTM Designation D 150–54T.

These samples were prepared by placing the reinforcing material between two glass plates. A flexible dam strip of rubberlike material, e.g., plasticized polyvinylchloride, is laid around the outer edge of the reinforcing material and between the two glass plates. This strip is slightly greater in thickness than that of the reinforcing material. The dam strip serves not only to enclose the space between the glass plates, but also prevents the glass plates from pressing on the reinforcing material. In addition, it serves to keep these plates parallel. Clamps or other securing means are placed around the plates to insure air-tight contact between the glass and the dam strip. It should be understood that a mold could be used equally well.

The assembled mold is next filled with the polymerizable liquid. This may be done by siphoning the liquid in from the bottom when the mold is on end or by pulling it in by vacuum.

The polymerizable liquid consisted of about 89% by weight of styrene, 11% by weight of divinylbenzene (55% grade, commercial), and about 0.2% by weight of an accelerator, benzoyl peroxide. It was surprising and unobvious that polypropylene could be successfully used as a reinforcing material for copolystyrene-divinylbenzene, because normally a heated resin-forming material, being an aromatic hydrocarbon, would act as a solvent for the polypropylene and attack the same, thereby destroying its reinforcing properties. However, apparently by using a low temperature during the initial polymerization and then gradually increasing the same until finally the mass solidifies during curing, a product is formed with superior electrical properties and increased impact strength. The specific time/temperature relationships will be discussed presently.

A convenient method for obtaining the proper filling rate is to observe the surface level of the rising liquid. If it is at a rate faster than proper, the surface level will bow downwardly; whereas, if it is at the proper level, the surface will be substantially flat. After filling was completed, the mold was sealed with collodion at the entrance and exit points.

The assembly was then processed to cause polymerization of the resin-forming liquid. This was accomplished by maintaining it at a temperature of 40–45° C. for two to four days, then at 60° C. for two days, at 80° C. for one day, and finally at 110° C. for two days. This method is only one example for accomplishing polymerization. It may also be carried out in a sealed mold by maintaining an endothermic-exothermic system through the states of increasing viscosity, gelation, and hardness to result in a high molecular weight addition polymer substantially free of monomer. Normally there will be less than 0.25% monomer present in the final product. When polymerization was completed, the assembly was taken apart and the reinforced article thus obtained was subjected to the foregoing described tests and the results appear in the following table.

| Sample | Reinforcing Material (percent by wt. of total wt.) | Impact Strength (ft./lbs. per inch of notch) | Dielectric Constant |
|---|---|---|---|
| 1 | None | 0.36 | 2.49 |
| 2 | 8% glass mat | 0.05–0.6 | 2.64 |
| 3 | 12% cross laid skeins of 210/34 polypropylene. | 12.0 | 2.45 |
| 4 | 35% plain woven fabric of 210/34 polypropylene, 64/41 warp/filling. | 4.4 | 2.45 |
| 5 | 6.5% commercial (L-O-F Glass Fibers Co.) glass microfibers felt 3/16" thick weighing 0.63 lb./sq. ft. | 0.28 | 2.61 |
| 6 | 12.8% nonwoven mat of lightly crimped polypropylene staple 1½" long, 6 den. per filam. | 3.5 | 2.45 |
| 7 | 25.6% plain weave ribbon of 210/34 polypropylene in warp and 35/8 polypropylene in filling, 45/7 warp/filling. | [1] 20.0 | 2.45 |

[1] (Sample did not break, only cracked.)

The above table illustrates that when polypropylene fiber or fabric is used as the reinforcing material, a resinous article of superior dielectric constant and impact strength is obtained. This is surprising, because the samples show that while glass reinforcement improves the impact strength, it also raises the dielectric constant, loss factor, specific gravity, and moisture sensitivity. However, when polypropylene is used, there is a still greater improvement in the impact strength and at the same time a reduction in dielectric constant, loss factor, and specific gravity, even below that of the unreinforced article.

The foregoing samples indicate that the polypropylene may be in the form of a staple, or continuous filaments, in nonwoven or woven form, and that the amount is not critical, being from 6–67% by weight based on the total weight of the article.

The sheets formed in the manner described above are in many respects superior to glass reinforced sheets. The electrical characteristics, particularly dielectric constant, are greatly improved, and the impact strength is considerably increased. These sheets, because of their superior electrical characteristics and impact strength, are ideally suited for use in high radio frequency and microwave equipment, for instance, as structural elements, or as base plates for printed circuits.

The foregoing examples have been selected as illustrative of this invention. It is contemplated that various modifications may be made without departing from the spirit and scope of this invention, it being understood that it is to be limited solely by the appended claims.

What is claimed is:

1. A method of producing a fiber reinforced article having an increased impact strength and superior electrical characteristics which comprises disposing a fibrous polypropylene reinforcing material in a confined zone, introducing a resin-forming low viscosity liquid consisting essentially of styrene and divinylbenzene into the zone at a controlled rate to insure thorough impregnation of the polypropylene reinforcing material without entrapment of gases, copolymerizing the resin-forming liquid by initially heating at low temperatures and gradually increasing the temperature whereby the resin begins to gel before it exercises any solvent action on the polypropylene, and finally subjecting the mass to a curing temperature.

2. A method of producing a fiber reinforced article having an increased impact strength and superior electrical characteristics which comprises disposing a fibrous polypropylene reinforcing material in a confined zone, introducing a resin-forming low viscosity liquid consisting essentially of styrene, divinylbenzene, and a catalyst into the zone at a controlled rate to insure thorough impregnation of the polypropylene reinforcing material without entrapment of gases, copolymerizing the resin-forming liquid by initially heating at low temperatures and gradually increasing the temperature in several stages whereby the resin begins to gel before it exercises any solvent action on the polypropylene, and finally subjecting the mass to a curing temperature.

References Cited by the Examiner

UNITED STATES PATENTS

| 2,903,389 | 9/59 | Fujita | 264—128 XR |
| 2,961,364 | 11/60 | Smith et al. | 264—109 XR |
| 2,966,157 | 12/60 | Touey et al. | 131—208 |
| 2,987,501 | 6/61 | Rieke et al. | 117—138.8 XR |
| 3,003,504 | 10/61 | Touey et al. | 131—208 |
| 3,028,284 | 4/62 | Reeves | 18—59 XR |

FOREIGN PATENTS

| 165,888 | 11/55 | Australia. |
| 881,899 | 11/61 | Great Britain. |

ALEXANDER H. BRODMERKEL, *Primary Examiner.*

EARL M. BERGERT, *Examiner.*